United States Patent [19]
Meyer

[11] 3,827,613
[45] Aug. 6, 1974

[54] GOLF BAG BICYCLE RACK

[76] Inventor: Marvin C. Meyer, 450 Norman Ct., Des Plaines, Ill. 60016

[22] Filed: Nov. 9, 1972

[21] Appl. No.: 305,117

[52] U.S. Cl.............................. 224/40, 224/32 A
[51] Int. Cl............................................. B62j 11/00
[58] Field of Search............ 224/30 R, 30 A, 32, 33, 224/36, 39, 40, 41, 42, 45, 37, 38, 32 A

[56] References Cited
UNITED STATES PATENTS
3,087,661  4/1963  Glenny.............................. 224/39 R FOREIGN PATENTS OR APPLICATIONS
869,817  10/1940  France............................. 224/32 A
834,899  3/1938  France............................... 224/33 R
916,753  7/1951  Germany............................. 224/40
523,411  7/1940  Great Britain..................... 224/33 R
85,055  12/1935  Sweden.............................. 224/33 R Primary Examiner—Robert J. Spar
Assistant Examiner—Kenneth Noland
Attorney, Agent, or Firm—Kinzer, Plyer, Dorn & McEachran

[57] ABSTRACT

A bicycle rack for carrying and supporting a golf bag containing clubs that is easily attachable and detachable while also being simply constructed.

8 Claims, 3 Drawing Figures

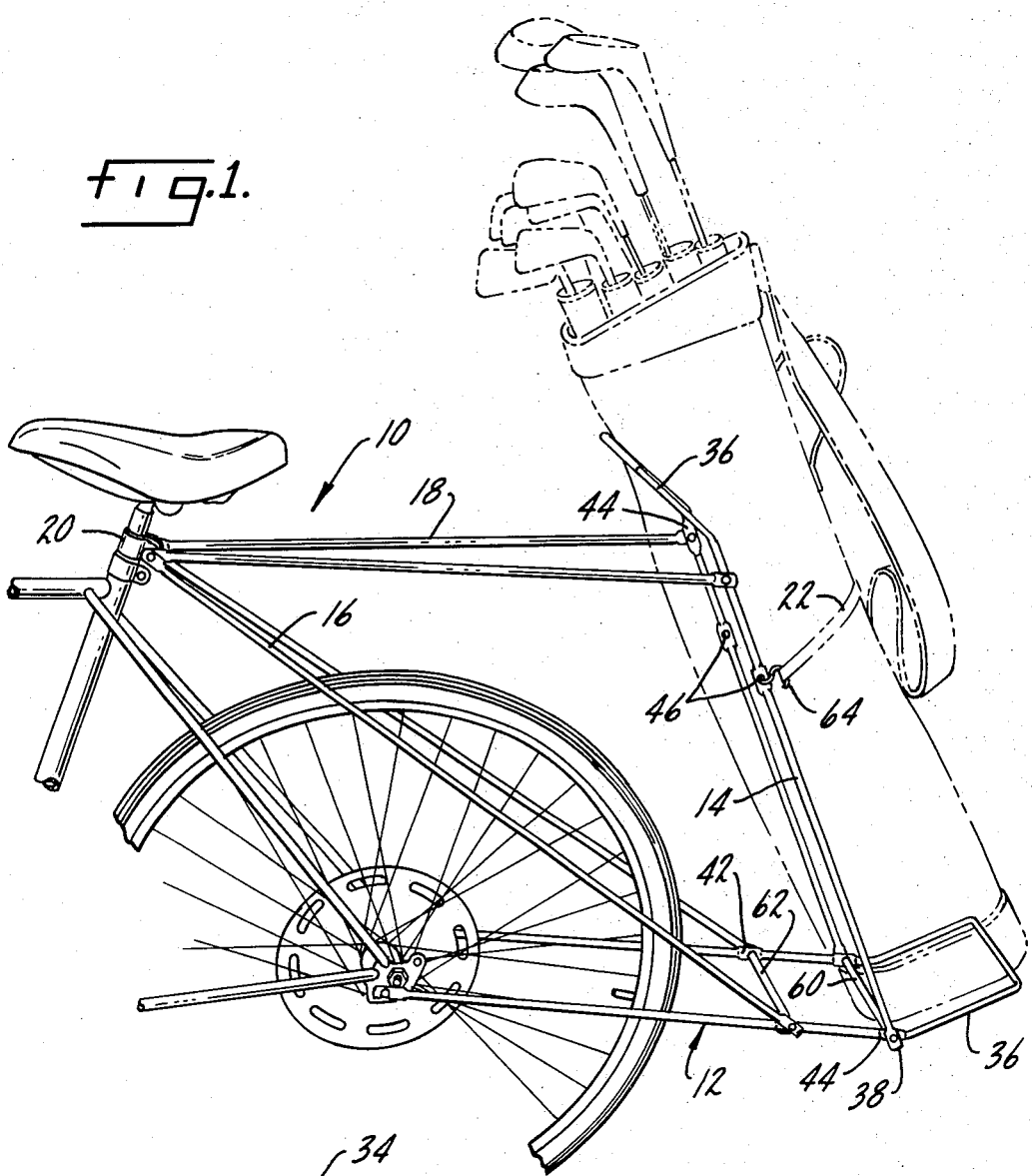
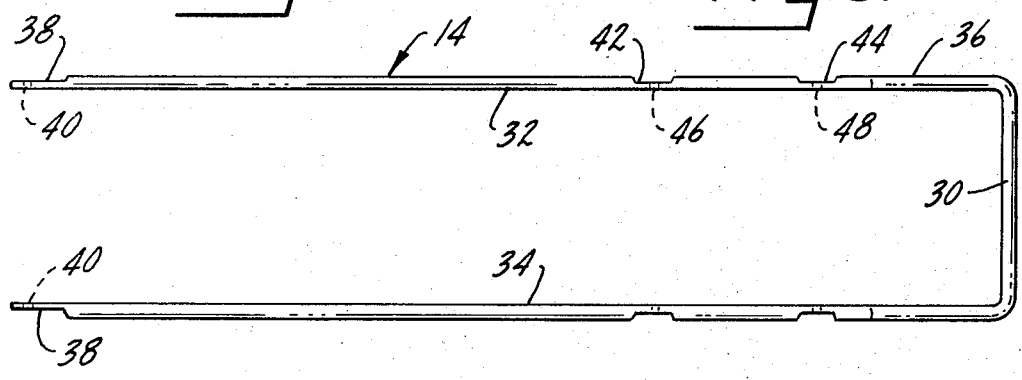

GOLF BAG BICYCLE RACK

SUMMARY OF THE INVENTION

This invention is in the field of bicycle racks or carriers and is concerned with means for supporting and carrying a golf bag containing clubs.

A primary object is a golf bag bicycle rack that is easily detachable and attachable to the bicycle.

Another object is a golf bag bicycle rack that does not interfere with the cyclist's freedom of movement, the bicycle's weight balance, or require the cyclist to assist in supporting the golf bag while standing or moving.

Another object is a bicycle rack that is foldable for storage.

Another object is a bicycle rack that is easily constructed of simple parts.

Another object is a bicycle rack that is lightweight.

Other objects will appear from time to time in the ensuing specification, drawings and claims.

BRIEF DESCRIPTION OF THE DRAWINGS

FIG. 1 is a side view of the bicycle rack as it attaches to a bicycle with a golf bag shown in phantom lines;

FIG. 2 is an enlarged partial side view of the attachment end of the horizontal bag support; and FIG. 3 is a top plan view of the horizontal bag support in more detail.

BRIEF DESCRIPTION OF THE INVENTION

The golf bag bicycle rack 10 of FIGS. 1, 2 and 3 includes a horizontal bag support 12 which extends rearwardly from the rear axle of the bike where it is attached. An inclined bag support 14 is attached to the horizontal bag support 12 towards the end farthest from the axle. A collar clamp 20 is attached to the seat post of the bicycle. An inclined support bracket 16 connects at one end to the horizontal bag support bracket 12 in back of the rear wheel and at its other end to the seat post collar clamp 20. A seat brace 18 is connected at one end to the inclined bag support 14 and at its other end to the seat post collar clamp 20. An elastic strap 22 encircles the golf bag and is attached to the inclined bag support 14 to retain the bag as shown in FIG. 1. The horizontal bag support 12, the inclined bag support 14, the diagonal support bracket 16 and the seat brace 18 are fabricated from ⅜ inch solid aluminum rod, although other materials and sizes, including tubular metals of various sizes are also satisfactory.

The horizontal bag support 12 and the inclined bag support 14 are identical for ease of manufacture. Each has the general shape of an elongated "U" or horseshoe shape with a short base portion 30 and elongated side branches 32 and 34. The spacing between the branches 32 and 34 is determined so as to clear the bicycle at the rear wheel and span the golf bag. A portion of each of the bag support brackets 12 and 14 at the closed base end 30 is inclined at 36 from the plane formed by the side branches 32 and 34 so as to support the bag as shown in FIG. 1. The horizontal bag support 12 supports the bottom of the golf bag and the inclined bag support 14 supports the golf bag along its length and near its top. Tabs or flat portions 38 are formed at the ends of the side branches 32 and 34 with holes 40 in the tabs 38 of the inclined bag support 14. The tabs 38 of the horizontal bag support 12 are formed with slot 41 adapted to fit the rear axle of the bicycle as shown in FIG. 2. Additional flat portions 42 and 44 are formed along the side branches 32 and 34 with holes 46 and 48 to provide for connection and support with the remaining parts of the invention, as will be described in detail hereinafter.

The two inclined support brackets 16 and the two seat braces 18 all have tabs similar to those of the bag supports 12 and 14 at each end, also including holes. Each of the seat braces 18 and the inclined support brackets 16 is a rod with a tab on each end, although the inclined support brackets 16 are longer than the seat braces 18 because of the various connection points. The holes in the end tabs of the two seat braces 18 and the two inclined support brackets 16 are aligned and fastened to the collar clamp 20 by appropriate fastening means such as a nut and bolt. The other ends of the seat braces 18 are connected at tabs 44 of the inclined bag support 14 by suitable fastening means such as screws. The tabs at the other end of the inclined support bracket 16 are connected to tabs 42 of the horizontal bag support 12 with suitable fastening means.

The inclined bag support 14 is connected at tabs 38 to the horizontal bag support 12 at tabs 44 by means of a support rod 60, shown in FIG. 1, that spans the side branches 32 and 34 of each bag support. Two screws or other suitable fastening means are placed through the holes in the appropriate tabs from each side of the branches 32 and 34 and into passages in the support rod 60. A similar support rod 62 is located at the connection of the inclined support bracket 16 and the horizontal bag support 12 at tabs 42 of the horizontal bag support 12 to provide additional support. All connections between the various support brackets and braces are made so as to allow pivoting at the various connection points. This allows folding of the bicycle rack for easy storage as well as ease of installation and flexibility for bikes of different dimensions.

To attach the golf bag bicycle rack 10 to the bicycle, the slots 41 of tabs 38 of the horizontal bag support 12 are placed over the rear axle after the rear axle nuts of the bicycle have been loosened. The rear axle nuts are then tightened to secure the golf bag bicycle rack. The tabs 38 may also be connected over the rear axle nuts with additional nuts if the axle length permits. Connection of the tabs 38 may also be accomplished at the rear fender screws of te bicycle. The connection of the inclined support bracket 16 and the seat braces 18 at seat post collar clamp 20 may be made in the assembled or disassembled state, allowing the seat post collar clamp 20 to be attached to the bicycle or to remain with the golf bag bicycle rack during storage. Removal of the bolt at the seat post collar clamp 20 allows for almost completely flat storage. In either case, the connection at the seat post collar clamp 20 is reassembled, thereby raising the golf bag bicycle rack to the correct position for carrying and supporting a golf bag.

The golf bag is placed along the inclined bag support 14 with the base of the golf bag resting on the inclined portion 36 of the horizontal bag support 12 as shown in FIG. 1. The elastic strap 22 is then fastened around the golf bag by "S" hooks 64 connecting the ends of the strap 22 to holes 46 of inclined bag support 14. The cyclist can now operate the bicycle normally while carrying and supporting the golf bag with no restrictions on the part of the cyclist. To detach the golf bag bicycle rack from the bicycle, the connection of the brackets 16 and 18 at the seat collar clamp 20 is disassembled and the rear axle nuts of the bicycle are loosened. The golf bag bicycle rack is now removed by lifting the tabs 38 of the horizontal bag support 12 from the rear axle.

Whereas the preferred form of the invention has been shown and described herein, it should be realized that there may be many modifications, alterations and substitutions thereto.

I claim:

1. A bicycle rack for supporting a golf bag on a bicycle having a collar clamp mounted around the seat post, a horizontal bag support extending rearwardly from the rear axle of the bicycle with slots at one end adapted to attach to the bicycle near the rear axle thereof, an inclined bag support extending upwardly from the rear of said horizontal bag support, at least one seat brace between the seat post collar clamp and said inclined bag support, at least one inclined support bracket between the seat post collar clamp and said horizontal bag support, and means for connecting said inclined support bracket and said seat brace to said collar clamp, said horizontal bag support and said inclined bag support being generally "U" shaped with two elongated branches and including portions at the "U" end that are inclined from the plane formed by said elongated branches to support the golf bag, the inclined portion of said horizontal bag support being inclined upwardly and supporting the bottom of the golf bag and tilting the golf bag toward the bicycle, the inclined portion of said inclined bag support being inclined inwardly toward the bicycle and supporting the golf bag near its top.

2. The structure of claim 1 further characterized by an elastic strap with two "S" hooks encircling the golf bag to provide further support and attaching to said inclined bag support.

3. The structure of claim 2 further characterized in that said horizontal bag support and said inclined bag support are fabricated from aluminum rod.

4. The structure of claim 1 further characterized by at least one support piece between the branches of said horizontal bag support and said inclined bag support.

5. The structure of claim 4 further characterized in that said support piece is fabricated from elongated cylindrical stock.

6. The structure of claim 1 further characterized in that said collar clamp includes holes in each side of the collar and in that said connecting means is a nut and bolt.

7. The structure of claim 1 further characterized in that said horizontal bag support, said inclined bag support, said seat brace, and said inclined support bracket include flattened tab portions with a hole at the points where they are connected and screws placed through the holes at the points of connection.

8. The structure of claim 1 further characterized in that said points of connection are pivotable allowing the golf bag bicycle rack to be folded flat for storage when removed from the bicycle.

* * * * *